(12) United States Patent  (10) Patent No.: US 7,107,831 B2
Markstaller et al.  (45) Date of Patent: Sep. 19, 2006

(54) VEHICLE WIND TUNNEL METHOD AND APPARATUS

(75) Inventors: Matthew G. Markstaller, West Linn, OR (US); Michael von Mayenburg, Lake Oswego, OR (US)

(73) Assignee: Freightliner LLC, Portland, OR (US)

( * ) Notice: Subject to any disclaimer, the term of this patent is extended or adjusted under 35 U.S.C. 154(b) by 0 days.

(21) Appl. No.: 10/996,734

(22) Filed: Nov. 23, 2004

(65) Prior Publication Data

US 2005/0120788 A1  Jun. 9, 2005

Related U.S. Application Data

(63) Continuation of application No. 10/003,169, filed on Nov. 14, 2001, now Pat. No. 6,820,477.

(51) Int. Cl.
*G01M 9/00* (2006.01)
(52) U.S. Cl. .................................................. 73/147
(58) Field of Classification Search ................... 73/147
See application file for complete search history.

(56) References Cited

U.S. PATENT DOCUMENTS

| 4,073,188 | A | 2/1978 | Slezinger et al. |
| 4,308,748 | A | 1/1982 | Jacocks |
| 4,735,085 | A | 4/1988 | Meyer |
| 4,750,355 | A | 6/1988 | Urabe et al. |
| 4,751,844 | A | 6/1988 | Matsushita |
| 5,495,754 | A | 3/1996 | Starr, Jr. et al. |
| 5,501,101 | A | 3/1996 | Purcell |
| 5,753,865 | A | 5/1998 | Lechtman |

OTHER PUBLICATIONS

Oran W. Nicks Low Speed Wind Tunnel Facility Handbook, Texas Engineering Experiment Station, Sep. 2000, pp. 3-12.

*Primary Examiner*—Harshad Patel
*Assistant Examiner*—Jermaine Jenkins
(74) *Attorney, Agent, or Firm*—Klarquist Sparkman, LLP

(57) ABSTRACT

A wind tunnel for measuring the aerodynamics of a vehicle may comprise a test section. Air moving through the test section may be collected in a plurality of individual ducts, each with a fan for moving the air through the test section and ducts. The vehicle of vehicle wheels may be supported at an incline.

38 Claims, 2 Drawing Sheets

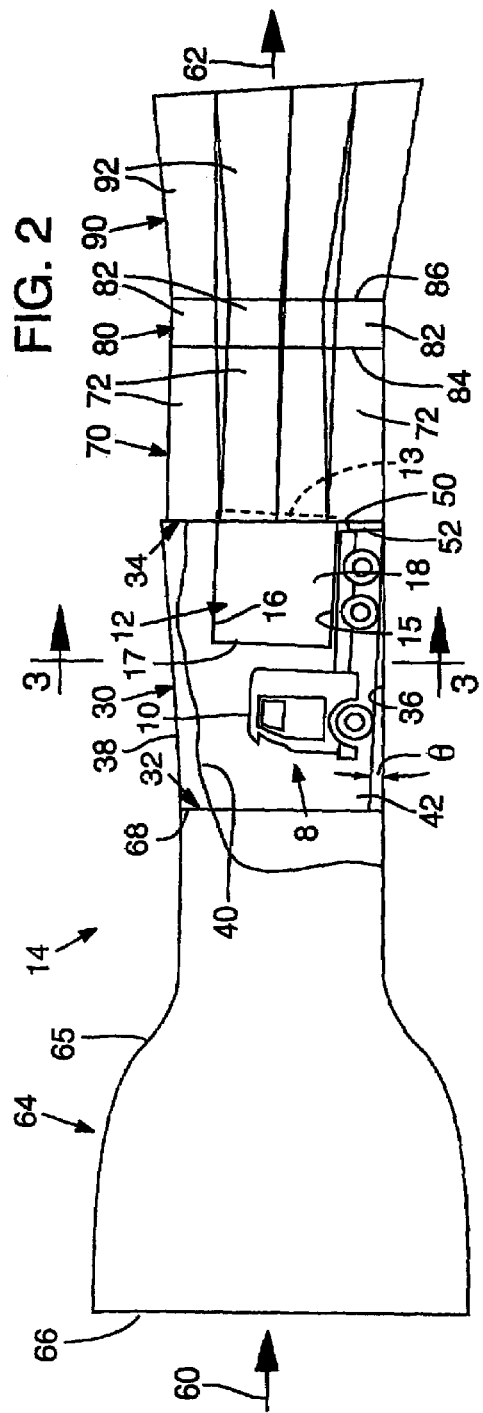
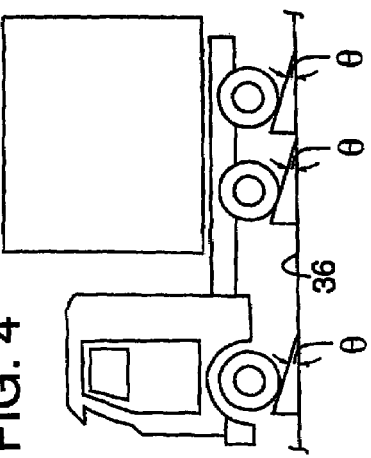
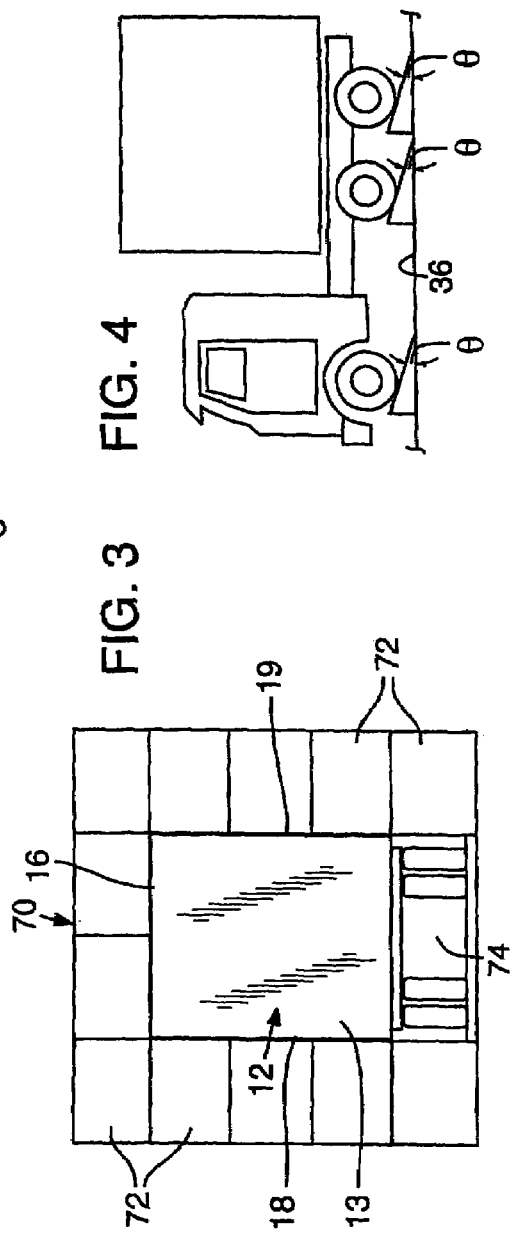

ND APPARATUS

CROSS REFERENCE TO RELATED APPLICATIONS

This application claims the benefit of U.S. patent application Ser. No. 10/003,169, filed Nov. 14, 2001, now U.S. Pat. No. 6,820,477. The prior application is incorporated herein by this reference.

The present invention relates to a wind tunnel for measuring the aerodynamics of a vehicle and has particular applicability to measuring the aerodynamics of trucks and truck tractors.

BACKGROUND

Generally speaking, a wind tunnel used to test the aerodynamics of a vehicle includes a housing within which a vehicle to be tested is positioned. An air flow generator or mover such as a fan or blower is used to create an air stream that is directed through a contraction cone and a test section within which the vehicle is positioned. Air typically exits from the wind tunnel through a diffuser. In one known approach, six extremely large fans were positioned in a single common duct downstream of the diffuser for moving air through the test section. This common duct was connected to a single additional downstream diffuser. Wind tunnels may be of an open circuit design in which atmospheric design where air is drawn into the contraction cone and discharged from the diffuser back to atmosphere. Alternatively, wind tunnels may be designed to recirculate air in a loop or return flow configuration. A wind tunnel also includes instrumentation for measuring the desired information, such as the wind drag created by a vehicle.

It is common practice to include the entire vehicle in a wind tunnel during a test. In the case of tractor trailer combinations, one common approach is to include either the tractor alone or the entire tractor and towed trailer or shortened mock towed trailer with or without wheels in the wind tunnel. In this latter case, the wind tunnel must be large enough to receive the entire tractor trailer combination.

A need exists for a new and improved wind tunnel and associated methods for measuring the aerodynamics of vehicles, such as, but not limited to, tractors of the type which tow trailers.

SUMMARY

In accordance with one embodiment, a wind tunnel for use in testing vehicles, such as cars, trucks, tractors, trains, airplanes and other vehicles, includes a housing with at least one air inlet and at least one air outlet. An air mover, which may comprise one or more blowers or fans, is coupled directly or indirectly to the housing and is adapted to create a flow of air through the housing in a direction from the air inlet toward the air outlet. The air mover may be downstream of the air outlet for drawing air through the housing or upstream of the air inlet for directing a flow of air into the housing.

A vehicle support is positioned at least partially within the housing for supporting a vehicle to be tested therein. The vehicle support is desirably operable to support the vehicle or the tires of the vehicle at an incline sloping from front to rear. Thus, in the case where entire vehicle is inclined, the vehicle is supported with its longitudal axis angled with respect to horizontal, and more specifically, angled upwardly from the rear toward the front of the vehicle. This would not typically be the case if only the tires of the vehicle are inclined.

A force measurer is coupled to the vehicle and is operable to measure the force resulting from the impingement or impact of moving air against the vehicle. Any suitable measuring device may be used, such as a conventional load cell positioned to engage a frame rail or other portion of the framework of the vehicle.

The incline at which the vehicle or vehicle tires may be supported may be adjustable. For wheeled vehicles, the angle is established at a magnitude which approximately compensates for the tire and bearing resistance of the vehicle so that more accurate measurements of the aerodynamics of the vehicle are obtained during the vehicle test. The inclined vehicle support, for example, may comprise any form of support which biases the vehicle in a desired direction, such as a bias which causes the wheels of the vehicle to roll backwardly in a front to rear direction. As a specific example, the vehicle support may comprise one or more inclined ramps positioned underneath the respective wheels of the vehicle. These ramps may take the form of plates which may be pivoted or otherwise adjustable to establish the desired incline. The plates may be manually adjustable or automatically adjustable such as in response to the operation of one or more hydraulic cylinders. The ramps may also be incorporated or built into the floor of the wind tunnel housing. Alternatively, the inclined support may be an inclined portion of the floor of the test section. The angle may be established at any desired magnitude. For example, a typical angle of incline ranges of from about one to about five degrees with two to three degrees incline from horizontal being more desirable typical angle. The angle is typically established to overcome and compensate for the static resistance to vehicle movement. The angle for each wheel is typically the same, although this is not necessary.

Air may exit from the housing of the wind tunnel through a plurality of ducts having duct inlets coupled directly to or indirectly to the air outlet of the housing. The air mover may comprise one or more fans coupled directly or indirectly to the air outlets for moving air through the housing. Desirably, a plurality of air movers are employed, each having a respective fan, for example. One such air mover and fan may be associated with and in communication with each of the respective ducts with the fan drawing air through the associated duct and from the housing or test section of the wind tunnel. The air movers typically include an air mover inlet and air mover outlet with an air flow generator such as fan positioned to draw air from the air mover inlet to the air mover outlet. The air mover inlets are coupled to the respective duct outlets of the air flow ducts which in turn are in communication with the air outlet of the housing. In a construction where the fans are isolated from one another by being coupled to separate ducts, interference between fans when they operate is minimized.

The wind tunnel also may comprise an air flow diffuser and more desirably a plurality of air flow diffusers. Each such diffuser may have a diffuser inlet in communication with, and coupled directly or indirectly to the air flow outlet of a respective one of the air flow generators. In one illustrated embodiment, there are at least ten of such air flow generators with associated ducts and diffusers. With this approach, relatively inexpensive HVAC fans may be used to moved the air through the test section.

The air flow ducts may be arranged in a generally horseshoe shaped or inverted U-shaped pattern at the air flow outlet end portion of the housing. A rear portion of the test vehicle may be positioned within this space with duct inlets being located along the sides and across the top of the vehicle. A pseudo-trailer may be coupled to the truck and surrounded along the sides and across the top by the duct inlets. The pseudo-trailer typically has no wheels and is of a length which terminates slightly rearwardly of the truck tractor to which the pseudo-trailer is coupled. The front of the pseudo-trailer has a foot print or a cross-sectional area which mimics the cross-sectional area of the front of a typical trailer to be towed by the truck tractor. The pseudo-trailer may also be configured to mimic the van or cargo portion of a truck and thus the term pseudo-trailer includes mock truck cargo portions of a vehicle. Although the wind tunnel may be expanded to accommodate full sized tractor-trailer combinations, a wind tunnel of reduced length may be used when pseudo-trailers are used in a vehicle test.

In one embodiment, the wind tunnel may comprise a conventional air contraction cone having an air contraction cone inlet through which air is drawn into the wind tunnel and a contraction cone outlet in communication with the air inlet end portion of the housing or test section of the wind tunnel. Although a recirculation system may be used, desirably the wind tunnel is an open system rather than one in which air is recycled.

The present invention is directed toward new and non-obvious features, method steps and acts as set forth herein both alone and in various subcombinations and combinations with one another.

BRIEF DESCRIPTION OF DRAWINGS

FIG. 2 is a partially broken away side elevational view of the wind tunnel embodiment of FIG. 1.

FIG. 3 is a cross-sectional view of the wind tunnel embodiment of FIG. 2 taken along lines 3—3 of FIG. 2.

FIG. 4 is a side elevation view of an alternative wind tunnel section with the wheels of a vehicle supported on ramps at a desired angle.

DETAILED DESCRIPTION

Figure 1:
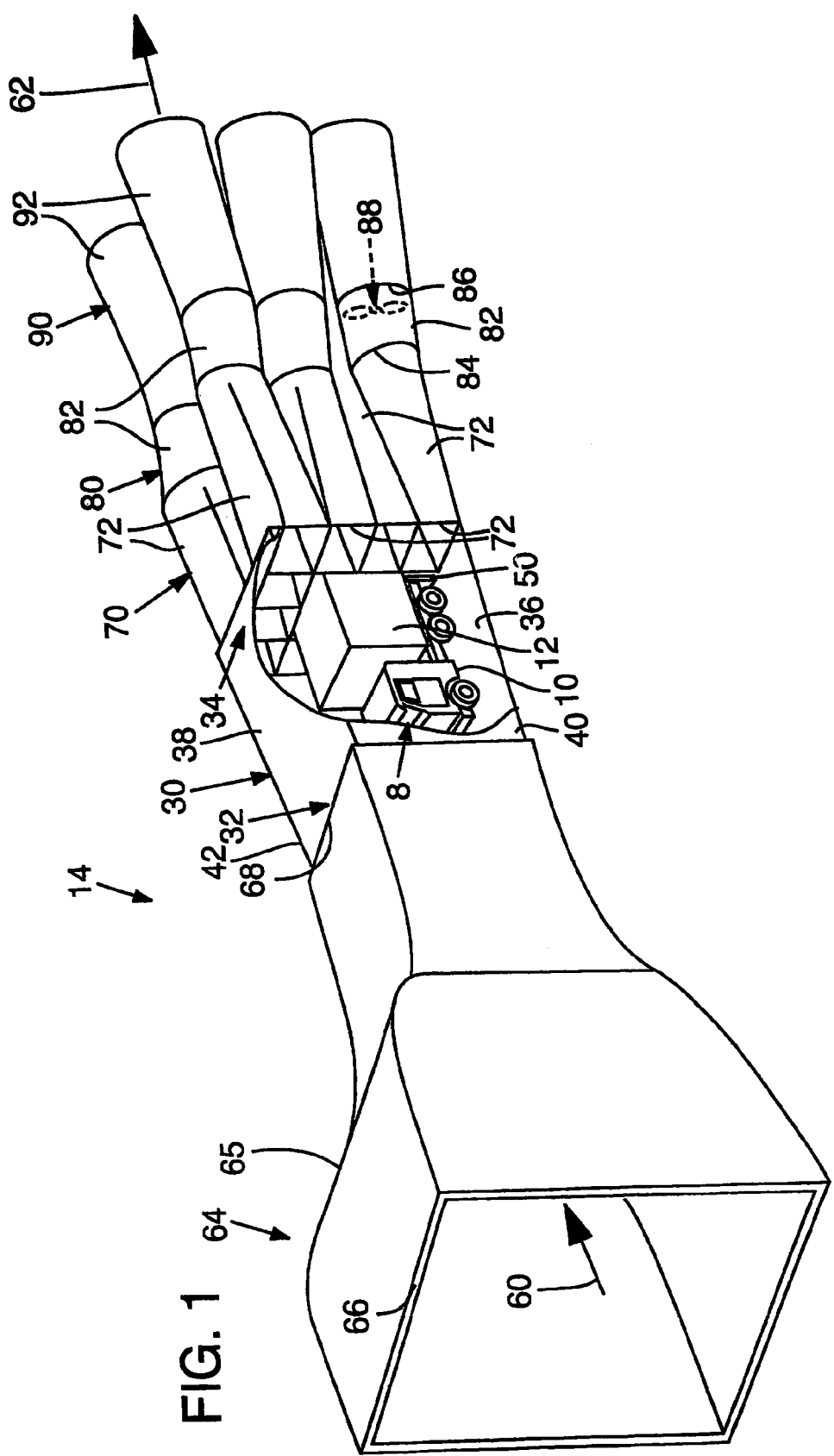
FIG. 1 is a perspective view of one embodiment of a wind tunnel illustrating an application in which the test vehicle, comprises a truck tractor and a pseudo-trailer.

With reference to FIGS. 1–4, embodiments of a wind tunnel 14 are illustrated in connection with determining the aerodynamic characteristics of a vehicle, in this case a tractor trailer assembly 8 comprising a tractor or cab portion 10 and a trailer portion 12. The trailer portion may be a full length trailer with the wind tunnel being expanded in length to accommodate a full length trailer in whole or part in a test section of the wind tunnel. More desirably, trailer 12 may be a pseudo or mock trailer as best illustrated in FIG. 2. In the FIG. 2 form, the pseudo-trailer has no wheels and has a rear end, which may be a wall 13, which terminates slightly rearwardly of the cab 10. The illustrated pseudo-trailer has a bottom 15, a top 16, a front 17 and first and second slide walls 18, 19. The front of the mock trailer 12 has a cross-sectional area or foot print which may be selected to approximate the cross-sectional area of a typical trailer which would be towed by the truck tractor or cargo portion of a truck. The size of the mock trailer may be varied to simulate different trucks and/or tractor-trailer combinations.

The use of a pseudo-trailer takes advantage of the fact that much of the information to be gleaned from testing the aerodynamics of a vehicle can be obtained without the need for a full sized trailer or truck van. Consequently, the length of the test section need only be long enough to accommodate the tractor or truck and that portion of the trailer or cargo van, in this case the pseudo or mock trailer used in testing. This reduces the expense of accomplishing wind tunnel testing as less space is required in this case than if a full length wind tunnel used. In addition, the illustrated construction shown in FIGS. 1–3 reduces power requirements for generating the air flow required for testing purposes. In addition, operating costs of the wind tunnel are reduced because the air flow need not overcome the drag on the rear portion of a full size trailer or cargo van.

The illustrated wind tunnel includes a test section within which the vehicle to be tested, or that portion of the vehicle which is to be tested, is positioned. One form of test section is indicated at 30. Test section 30 comprises a housing having a front or air inlet end portion 32 and a rear or air outlet end portion 34. The illustrated housing 30 includes a floor 36, a roof 38 and first and second sidewalls 40, 42. Typically the transverse cross-sectional area of the housing 30 is greater at air outlet end 34 than at air inlet end 32. The cross-sectional dimension may progressively increase moving from the front towards the rear of the housing, or may otherwise vary along the length along the housing. Although not required, desirably the transverse cross-sectional area of that portion of the air outlet 34 which is unblocked by the vehicle being tested is substantially equal to the transverse cross-sectional area of the air inlet portion of the housing. This is commonly referred to as streamlining. Alternatively, the test section may be of uniform cross-section or may take on any other desirable configuration. As a specific example, the air inlet 32 may be rectangular and have an area which is 20 feet tall by 25 feet wide. The air outlet 34 may also be rectangular with roughly the same exit area (after subtracting the truck/truck tractor and pseudo-trailer cross-sectional dimension). Typically, relatively little air flows underneath a truck or truck tractor.

A force measuring mechanism is typically coupled to the vehicle being tested for purposes of measuring the air resistance characteristics of the vehicle. The force measurement device may take any suitable form. As a specific example, a load cell 50 is carried by a support 52 in position for engaging the vehicle being tested. In this example, the load cell is positioned for coupling directly or indirectly to a portion of the frame of the vehicle. One or more such load cells may be used. Alternative force measurement mechanisms include, but are not limited to load cells, spring scales and weight balances. A strain gauge is one specific exemplary type of load cell that may be used. The force measurement device measures the force against the vehicle, typically under no load (e.g. no wind) and load (various wind level) conditions.

The vehicle being tested may be supported at an incline within the test section 30. This incline is represented by the exaggerated angle θ in FIG. 2. More specifically, the vehicle may be supported such that the front-end portion of the vehicle is elevated relative to the rear end portion of the vehicle. For example, a ramp or other sloped surface may be incorporated into the floor of the test section. Alternatively, plates or other supports may be positioned to support the wheels of the vehicle on an incline. In this case, the vehicle may be, for example, horizontal. Such plates or supports may be, for example, pivoted to the floor of the housing 30 with the angle θ being adjusted as desired to alter the angle of the inclined support. The ramps may be manually adjusted or selected to establish the desired angle θ. Support plates may, for example, be held in place by stops before the vehicle is placed on the ramps. Alternatively, automatic adjustment mechanisms to establish the angle θ, such as hydraulic cylinders. The vehicle is biased by the inclined support (e.g., by the floor ramps or other inclined support)

to roll in a front to rear direction. FIG. 4 shows an example where the vehicle is level and the vehicle tires are positioned on floor supported ramps that are inclined forwardly and upwardly at an angle θ from horizontal. The ramps may be adjustable to adjust the angle θ. Alternatively, separate sets of ramps may be used, each set at a desired angle of incline. Most desirably, the downward angle of a floor or other vehicle support is established at a level which is sufficient to overcome the static tire and wheel bearing friction of the vehicle so as to permit the vehicle being tested to roll backwards toward the rear end portion of the test section against the load measuring device, such as the load cell 50. Accordingly, the aerodynamic drag of the vehicle being tested may be determined more directly by subtracting the load on the load cell measured when there is air flow from the static load on the load cell with these friction components being compensated for by the angle of the vehicle support.

Although variable, typically the angle θ ranges from one to five degrees, although this typically depends upon the vehicle. A more optimum range is expected to be typically two to three degrees for trucks and truck tractors. Again, the angle may be varied or established at specific level for given types or models of vehicles being tested. It should be noted in FIG. 2 that the floor, as well as the other components designated as part of the housing 30, may be separate components and may be assembled together to define the interior of the test section of the vehicle.

The illustrated wind tunnel 14 is of an open construction design meaning that air is taken into the tunnel at one end portion 60 and exits the wind tunnel at an opposite end portion 62. This is in contrast to a recirculating loop design where air is continually recirculated through the wind tunnel. It should be noted that the present invention is not limited to an open system design. As an optional desirable feature, the wind tunnel assembly 14 may include a contraction cone, such as indicated generally at 64, leading to the inlet 32 of the test section. Contraction cone 64 may be of a conventional matched cubic design. The illustrated contraction cone 64 includes a body 65 having a contraction cone air inlet 66 and a contraction cone air outlet 68 in communication with the air inlet 32 of test section 30. An exemplary contraction cone 64 may have an air inlet 66 with a transverse cross-sectional dimension of about 50 feet high and 55 feet wide in a specific exemplary embodiment where test section inlet 32 is 20 feet high by 25 feet wide. These dimensions are examples only and may be varied. The purpose of contraction cone 64 is to accelerate the air smoothly and uniformly to the test section while reducing energy requirements. Also, the sides and top wall of the test section may optionally be positioned to follow the far field air flow lines of air flowing through the system.

The outlet 34 of test section 30 may be coupled to a single duct or otherwise coupled to a wind tunnel outlet. Desirably, in the illustrated embodiment, air outlet 34 is coupled to an air flow duct section 70 which, in the illustrated embodiment, is comprised of a plurality of individual ducts, some of which are indicated at 72 in the figures. Desirably, although not necessarily, at least eight such ducts are provided and more desirably ten to twelve of such ducts. Optionally, one or more additional ducts 74 may be positioned underneath the vehicle to receive air passing through the test section at this location. Alternatively, this area may simply be blocked off. The ducts 72 in the embodiment shown each have a duct inlet in communication with the outlet 34 of test section 30. In this desirable example, the duct inlets are directly connected to the outlet 34. In addition, each of the ducts also have a downstream outlet end portion. The ducts may be lined with sound absorbing or insulation material. As best seen in FIG. 3, in the illustrated embodiment, a plurality of ducts are provided and positioned in a stack along the respective sides 18, 19 of the trailer 12 and with a row of ducts extending across the top of the trailer. Although the configuration may be varied, in the form shown, the ducts are arranged in an inverted U-shaped or horseshoe-shaped pattern. The ducts adjoining the trailer or pseudo-trailer 12 have innermost walls desirably in contact with the respective side walls 18, 19 and top 16 of the pseudo-trailer. In the construction shown, substantially all of the air passing through the test section 30 exits through one of the ducts 72 (with the exception of the possibility of air escaping through one or more additional ducts at location 74 underneath the trailer). It is also possible, although less desirable, to vent some of the vented air without directing the air through one of the ducts 72. The illustrated wind tunnel 14 also includes at least one air mover indicated generally at 80, and in this desirable example, a plurality of air generators or movers, some of which are indicated at 82. Desirably, one air mover or air flow generator 82 is provided in association with of each of the ducts 72. For example, the lower most air mover 82 indicated in FIGS. 1 and 2 is shown with an air mover inlet 84 in communication with and in this case connected directly to the outlet of its associated duct 72 and an air mover outlet 86. In addition, each air mover typically includes a fan or blower, (indicated schematically at 88 for air mover 82 in FIG. 1). Thus, in the embodiment shown in FIGS. 1–3, twelve ducts 72 are included, each with an associated air mover such as including a blower 82. The use of a plurality of exit ducts and blowers reduces the cost of the wind tunnel in comparison to the use of a single duct and a large fan or fans and also may be accomplished in a smaller space.

The wind tunnel 14 may desirably be provided with an air diffuser section 90 which may be a single air diffuser, such as in applications where a single blower is used. However, in the embodiment shown, the diffuser section 90 includes a plurality of air diffusers which each may be of a bell shape as shown. Some of these air diffusers are indicated at 92 in FIGS. 1 and 2. The air diffusers reduce the air flow rate to regain static pressure within the system. Typically the air flow diffusers are lined with sound absorption material or insulation. In the illustrated example, each air diffuser is directly connected to only one air mover outlet, although this is not required.

With the above construction, the blowers 82 may be conventional HVAC fans. The number of fans and thus the number of air ducts 72 employed in the wind tunnel 14 will be determined by the amount of air required to be moved through the wind tunnel when testing the aerodynamics of a vehicle. Typically about 10–12 fans will generate enough air flow to measure the aerodynamic drag over the tractor cab 8 and forward end portion of a pseudo-trailer 12. The use of conventional HVAC fans is advantageous in they are less expensive and require less space than a traditional wind tunnel fan.

Having described the principals of our invention with reference to several embodiments, it should be apparent to those of ordinary skill in the art that our invention may be modified in arrangement and detail without departing from such principals.

We claim all modifications which fall within the scope and spirit of the following claims.

We claim:

1. A wind tunnel for use in aerodynamic testing of a vehicle having wheels comprising:
   a housing having at least one air inlet and at least one air outlet;
   at least one air mover and associated duct positioned in cooperative relationship with the housing to create a flow of air through the housing in a first direction from the air inlet toward the air outlet;
   a vehicle support positioned at least partially within the housing and which has an inclined support surface which is angled with respect to horizontal and is operable to support the vehicle by the wheels such that the vehicle is biased toward movement in the first direction; and
   a force measurer positioned to engage the vehicle and operable to measure the force resulting from the impact of moving air against the vehicle;
   wherein the vehicle is moved in the first direction to couple the vehicle to the force measurer.

2. A wind tunnel according to claim 1 in which the angle of incline of the inclined support surface is adjustable.

3. A wind tunnel according to claim 1 in which the vehicle support comprises at least one inclined ramp.

4. A wind tunnel according to claim 1 in which the housing has a floor and the inclined support surface comprises a portion of the floor of the housing.

5. A wind tunnel according to claim 1 in which the incline of the inclined support is from about one degree to about five degrees.

6. A wind tunnel according to claim 1 in which the incline of the inclined support surface is established at a magnitude to compensate for static friction that must be overcome for a wheeled vehicle to commence movement.

7. A wind tunnel according to claim 1 in which the incline of the inclined support surface is established at a level such that the force measurer indicates a substantially zero force measurement in the absence of moving air impacting the vehicle.

8. A wind tunnel according to claim 1 in which the air mover comprises at least one fan.

9. A wind tunnel according to claim 1 in which the farce measurer comprises at least one load cell positioned to engage the vehicle.

10. A wind tunnel according to claim 1 in which the housing comprises a plurality of air outlets and the air mover comprises a plurality of fans coupled to the air outlets for moving air through the housing.

11. The wind tunnel of claim 1 wherein the inclined support surface biases the vehicle to roll in the first direction.

12. The wind tunnel of claim 1 wherein the vehicle support has an unobstructed rearward rolling path extending in the first direction.

13. A wind tunnel for use in aerodynamic testing of a vehicle comprising:
   a housing having at least one air inlet and at least one air outlet;
   at least one air mover and associated duct positioned in cooperative relationship with the housing to create a flow of air through the housing in a first direction from the air inlet toward the air outlet;
   a plurality of ramps positioned to support the wheels of a vehicle being tested on respective inclined surfaces of the ramps to bias the vehicle to roll in the first direction; and
   a force measurer positioned to engage the vehicle and operable to measure the force resulting from the impact of moving air against the vehicle.

14. A wind tunnel according to claim 13 in which the inclined surfaces are each inclined at the same angle.

15. A wind tunnel for use in aerodynamic testing of a vehicle comprising:
   a test section for receiving a vehicle, the test section comprising a first end portion, a second end portion and an inclined vehicle support;
   at least one air flow generator for creating air flow through the test section in a direction from the first end portion to the second end portion; and
   a force measurer for measuring the force applied by the moving air to the vehicle, the force measurer being positioned to engage the vehicle;
   wherein the inclined vehicle support urges the vehicle to move into contact with the force measurer.

16. A wind tunnel of claim 15 in which the force measurer is disposed proximate the second end portion for engaging the vehicle to measure the force.

17. The wind tunnel of claim 15 wherein the force measurer comprises a load cell.

18. The wind tunnel of claim 15 further comprising a plurality of air flow generators for creating air flow through the test section, each air flow generator comprising an air flow inlet and an air flow outlet the wind tunnel further comprising a plurality of air flow ducts, each of which has a first end in direct communication with the second end portion of the test section and a second end in communication with the air flow inlet of at least a respective one of said air flow generators.

19. The wind tunnel of claim 18 further comprising a plurality of diffusers, each diffuser comprising a diffuser inlet in communication with the air flow outlet of one of said air flow generators.

20. The wind tunnel of claim 19 further comprising a contraction cone having a contraction cone air inlet and a contraction cone air outlet in communication with the first end portion of the test section.

21. The wind tunnel of claim 19 wherein the air flow ducts are arranged with their first ends in a generally horseshoe configuration.

22. The wind tunnel of claim 18 wherein there are at least eight of said air flow generators.

23. The wind tunnel of claim 15 wherein the at least one air flow generator is a fan.

24. A wind tunnel for generating air flow over a surface of a vehicle comprising:
   a test section having an air inlet and an air outlet; and
   a plurality of air ducts, each air duct comprising at least one duct inlet and at least one duct outlet, the duct inlets being positioned at the air outlet of the test section; and
   a plurality of air flow movers, each air flow mover comprising a mover inlet and a mover outlet, the mover inlets of the air flow movers each being coupled to a respective at least one duct outlet of at least one of the said air ducts.

25. The wind tunnel of claim 24 wherein the air ducts are arranged to define at least a portion of a chamber in which a rear portion of a vehicle may be positioned with the remaining portion of the vehicle being positioned in the test section.

26. The wind tunnel of claim 25 further comprising a plurality of diffusers, each diffuser comprising a diffuser inlet coupled to a respective at least one mover outlet of one of said air flow movers.

27. The wind tunnel of claim 24 wherein there is a separate individual air mover for each of said ducts.

28. The wind tunnel of claim 27 wherein there is a separate individual diffuser coupled to each air mover.

29. The wind tunnel of claim 28 further comprising a contraction cone having a contraction cone outlet coupled to the air inlet of the test section.

30. The wind tunnel of claim 24 wherein the air ducts are positioned at least along the sides and across the top of the test section air outlet.

31. A wind tunnel for generating air flow over a surface of a vehicle, the wind tunnel comprising:
   a test section having a forward end portion, a rear end portion, and a length extending therebetween, the test section having an air outlet adjacent to the rear end portion; and
   a plurality of air ducts, each having a duct inlet and a duct outlet, the duct inlet of each air duct being coupled to the air outlet of the test section, the air ducts being arranged to position the duct inlets in a generally horseshoe shaped configuration; and
   at least one air mover coupled to at least one of the plurality of ducts and operable to move air through the test section and air ducts.

32. The wind tunnel of claim 31 comprising an inclined vehicle support.

33. The wind tunnel of claim 32 wherein the vehicle has wheels and the included vehicle support comprises a plurality of vehicle wheel supporting ramps.

34. A wind tunnel test section for use in aerodynamic testing of a vehicle comprising a first end portion, a second end portion, and a vehicle support comprising at least one inclined support surface positioned to support the vehicle, wherein the angle of the slope of the inclined support surface is set to minimally exceed the static wheel bearing and tire friction of the vehicle such that the vehicle is moved into contact with a force measurer to apply a first force to the force measurer, and wherein moving air introduced into the test section subjects the force measurer to a second force greater than the first force, and wherein the difference between the first force and the second force is representative of the force of the moving air on the vehicle.

35. The wind tunnel test section of claim 34 in which the inclined support surface comprises an inclined surface of a plurality of ramps at least one such ramp supporting each of the wheels of the vehicle.

36. A wind tunnel for generating air flow over a surface of a vehicle which is a truck or truck tractor of the type used to tow a trailer, the wind tunnel comprising:
   a test section having a forward end portion, a rear end portion, and a length extending therebetween, the test section having a vehicle support that slopes downward at an angle of incline which is sufficient to overcome the static tire and wheel bearing friction of the vehicle being tested;
   a plurality of air ducts, each duct comprising a duct inlet and a duct outlet, the duct inlet of each air duct being directly coupled to the air outlet of the test section and the air ducts being arranged such that the duct inlets are in a generally horseshoe shaped configuration;
   a plurality of air flow movers, each air flow mover comprising an air mover inlet and an air mover outlet, each air mover inlet being coupled to a respective one of the duct outlets, each air mover comprising a fan for moving air through the air mover and thereby through the test section;
   a plurality of diffusers, each air diffuser comprising a diffuser inlet coupled to the air mover outlet of a respective one of said air movers and a diffuser outlet in communication with the atmosphere; and
   a contraction cone having a contraction cone air inlet in communication with the atmosphere and a contraction cone air outlet coupled to the forward end portion of the test section.

37. A wind tunnel for use in aerodynamic testing of a vehicle comprising:
   housing means for receiving the vehicle to be tested, the housing means having a front end portion and a rear end portion;
   vehicle support means for supporting the vehicle or vehicle wheels at an angle;
   duct means coupled to the rear end portion of the housing means far directing air from the housing means;
   air mover means coupled to the duct means for moving air through the duct means and thereby through the housing means; and
   force measurement means positioned to engage the vehicle being tested for measuring the force of air moving against a vehicle in the housing means;
   wherein the vehicle support means urges the vehicle to roll into contact with the force measurement means.

38. A wind tunnel according to claim 37 comprising a contraction cone means coupled to the housing front end portion and air diffuser means coupled to the air mover means.

* * * * *

UNITED STATES PATENT AND TRADEMARK OFFICE
CERTIFICATE OF CORRECTION

PATENT NO. : 7,107,831 B2
APPLICATION NO. : 10/996734
DATED : September 19, 2006
INVENTOR(S) : Matthew G. Markstaller and Michael von Mayenburg It is certified that error appears in the above-identified patent and that said Letters Patent is hereby corrected as shown below:

<u>In the Claims:</u>
Column 7, line 43 Claim 9, "farce measurer" should read --force measure--.

Signed and Sealed this

Twelfth Day of August, 2008

JON W. DUDAS
*Director of the United States Patent and Trademark Office*